United States Patent [19]
Burgess

[11] 3,721,468
[45] March 20, 1973

[54] AUTO PADDED WINDSHIELD

[76] Inventor: Stanley E. Burgess, P.O. Box 220, Route 16, Somersworth, N.H. 03878

[22] Filed: June 22, 1971

[21] Appl. No.: 155,439

[52] U.S. Cl. ..........................296/84 K, 280/150 B
[51] Int. Cl. ...............................................B60r 21/08
[58] Field of Search ...............296/84 K; 280/150 B

[56] References Cited

UNITED STATES PATENTS

| | | | |
|---|---|---|---|
| 2,180,912 | 11/1939 | Rogers | 296/84 K |
| 2,477,933 | 8/1949 | Labser | 280/150 B |
| 2,843,420 | 7/1958 | Rich | 296/84 K |
| 2,854,281 | 9/1958 | Cassin | 296/84 K |
| 2,933,343 | 4/1960 | Potts | 296/84 K |
| 3,037,809 | 6/1962 | Praha | 296/84 K |

FOREIGN PATENTS OR APPLICATIONS

| | | | |
|---|---|---|---|
| 1,549,382 | 11/1968 | France | 296/84 K |

Primary Examiner—Kenneth H. Betts
Assistant Examiner—John A. Pekar

[57] ABSTRACT

A device to protect automobile passengers from impact against the glass windshield in case of a collision, the device consisting of a foam filled pad which in an inoperative position rest adjacent the underside of the vehicle roof, and which in case of a collision due to momentum force instantly slides down adjacent the interior side of the windshield so to provide a soft and harmless cushion against which the passengers are thrown.

1 Claim, 4 Drawing Figures

PATENTED MAR 20 1973 3,721,468
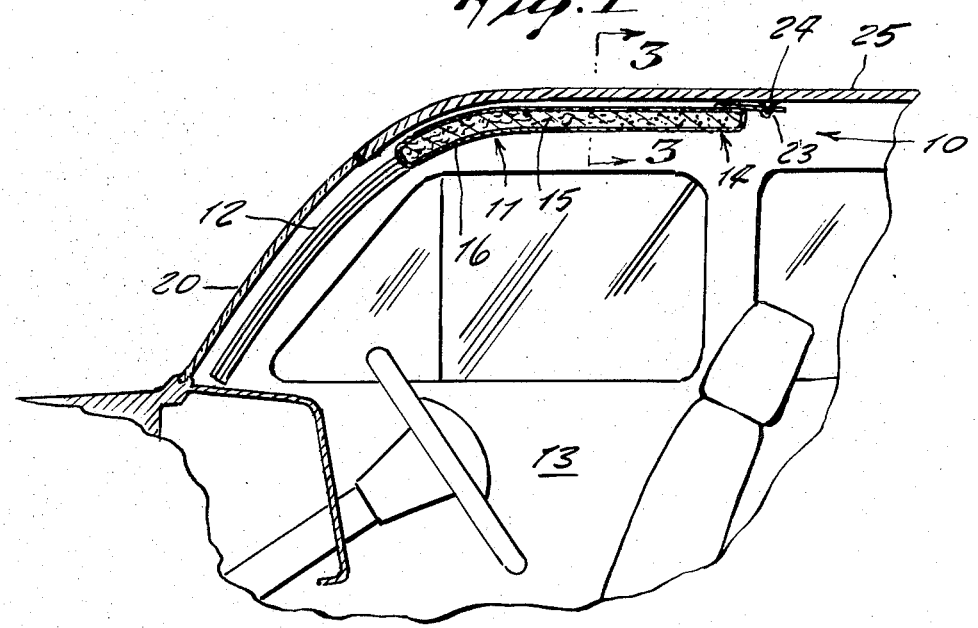
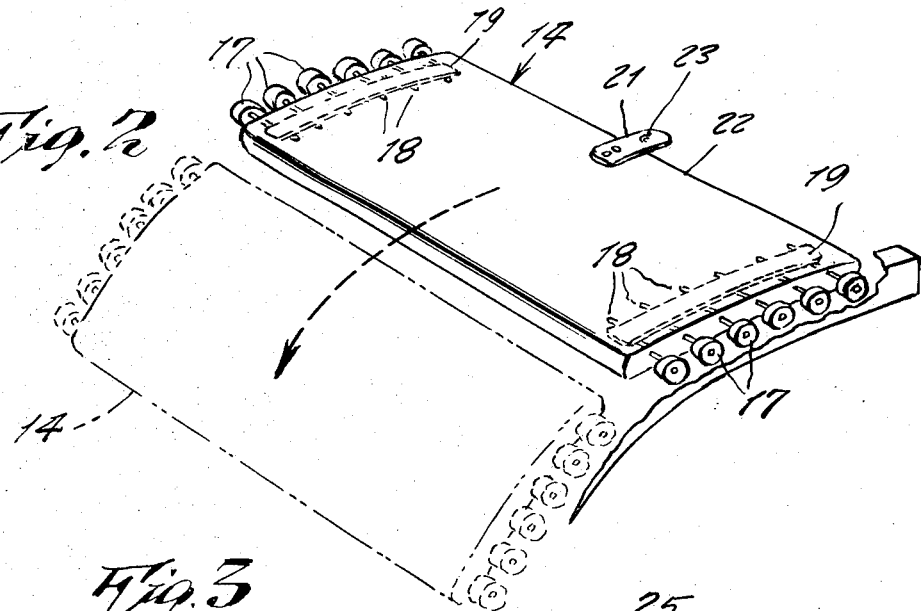
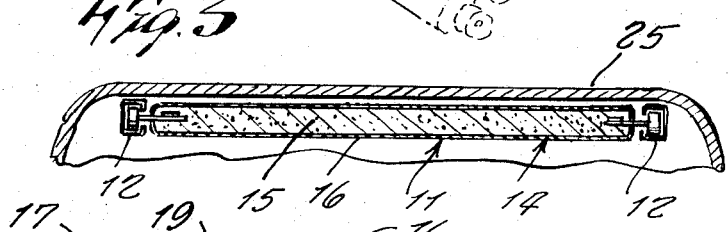
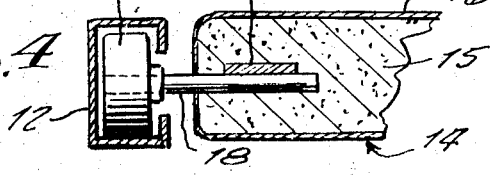
INVENTOR
STANLEY E. BURGESS

AUTO PADDED WINDSHIELD

This invention relates generally to automobiles. More specifically it relates to passenger protective devices built into an automotive vehicle.

A principle object of the present invention is to provide padded windshield for an automobile so to protect passengers from being thrown into the glass windshield in case of a front collision.

Another object is to provide a padded windshield which when not in use forms a ceiling of the vehicle roof and which may be made to harmonize in style and color to the vehicle interior decor.

Yet another object is to provide a padded windshield which automatically instantly and quickly moves from its stored retracted ceiling position into a position adjacent the windshield to shield the passengers when a head on collision occurs.

Yet another object is to provide a padded windshield made of chick resilient foam material so to absorb shock of impact and cushion persons thrown thereagainst.

Yet another object is to provide a padded windshield that can be instantly reset for re-use so to provide continued protection.

Yet a further object is to provide a padded windshield that can be sold as an accessory for being installed into existing vehicles, as well as being built into new cars during production.

Other objects are to provide a padded windshield which is simple in design, inexpensive to manufacture, rugged in construction, easy to use and efficient in operation.

These and other objects will be readily evident upon a study of the following specification and the accompanying drawing wherein:

FIG. 1 is a side cross sectional view of a car shown fragmentarily, and illustrating the present invention installed therewithin.

FIG. 2 is a perfective view of the slidable padded windshield unit shown alone.

FIG. 3 is a cross sectional view taken on line 3—3 of FIG. 1.

FIG. 4 is an enlarged detail view thereof.

Referring now to the drawing in detail, the reference numeral 10 represents a padded windshield according to the present invention wherein there is a slidable pad unit 11, that is movable along a pair of tracks 12 along opposite sides of the automobile 13.

The unit 11 includes a pad 14 consisting of a thick foam resilient padding material 15 enclosed within a cover 15. Along each side edge 17 of the pad 14 a series of freely rotating rollers 17 are carried on pins 18 that protrude into the pad 14 where they are secured to a flexible spring metal band 19 enclosed within the pad.

Each track 12 comprises a channel within which the rollers can travel, the channels being shaped so to carry the pad closely to a rear side of the automobile windshield 20.

A spring steel tongue 21 along a rear edge 22 of the pad has a downward depression 23 for engaging a downward protruding detent 24 secured to the underside of car roof 25, so to normally retain the pad adjacent the roof.

In operative use, in case of a sudden panic stop or head on collision, the momentum force will cause the detent tongue 21 to disengage with detent 24 and also cause the pad unit to continue forwardly travel. Due to the vehicle being suddenly stopped, this momentum forces the pad with its rollers in the tracks 12 to constantly drop behind the glass windshield so that it is in place before a passenger thrown forwardly can reach the glass windshield, thus protecting him by the soft cushion and prevent getting cut on the windshield 20 glass.

The pad unit 11 can be full length to completely form the roof ceiling for a greater momentum instant force and to give a single straight streamlined face to the ceiling.

While various changes may be made in the detail construction, it is understood that such changes will be within the spirit and scope of the present invention.

I claim:

1. A windshield crash protective device for vehicles comprising a soft flexible pad mounted movably in the vehicle above the front seat passengers, said pad being movable from an inoperative position above the front seat to an operative forward position adjacent to and spaced from the windshield, in combination with a pair of similar tracks provided on opposite sides of the vehicle, extending from a point adjacent the dashboard, upwardly and rearwardly paralleling the windshield and vehicle roof to a position to the rear of the front seat passengers, said tracks being channel shaped, said pad having a smooth pliant cover enclosing resilient padding material, including a series of roller assemblies mounted on opposite sides of said pad, said rollers being enclosed in said tracks and having shafts extending into the pad, each of said assemblies including a resilient retaining band within said pad secured at right angles to said shafts, in further combination with a detent member extending axially rearward of said pad and coacting detent means mounted on the vehicle roof in alignment with said detent member.

* * * * *